(12) United States Patent
Misenheimer et al.

(10) Patent No.: US 11,753,187 B2
(45) Date of Patent: Sep. 12, 2023

(54) SYSTEM AND METHOD FOR PERFORMING ENHANCED MAINTENANCE OF AIRCRAFT

(71) Applicant: GE Aviation Systems LLC, Grand Rapids, MI (US)

(72) Inventors: Steven Lane Misenheimer, Grand Rapids, MI (US); Christin L. Rauche, Cincinnati, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 298 days.

(21) Appl. No.: 17/008,982

(22) Filed: Sep. 1, 2020

(65) Prior Publication Data

US 2022/0063839 A1    Mar. 3, 2022

(51) Int. Cl.
*B64F 5/60* (2017.01)
*B64F 5/40* (2017.01)
*G07C 5/08* (2006.01)

(52) U.S. Cl.
CPC ............... *B64F 5/60* (2017.01); *B64F 5/40* (2017.01); *G07C 5/0808* (2013.01)

(58) Field of Classification Search
CPC . B64F 5/60; B64F 5/40; G07C 5/0808; G05B 23/0278; G05B 2219/24019; G05B 2219/45071
See application file for complete search history.

(56) References Cited

U.S. PATENT DOCUMENTS

| | | | |
|---|---|---|---|
| 6,115,656 A | 9/2000 | Sudolsky | |
| 6,289,289 B1 | 9/2001 | Zweifel | |
| 6,748,304 B2 | 6/2004 | Felke et al. | |
| 6,751,536 B1 | 6/2004 | Kipersztok et al. | |
| 6,795,935 B1 | 9/2004 | Unkle et al. | |
| 7,149,612 B2 | 12/2006 | Stefani et al. | |
| 8,560,160 B2 | 10/2013 | Holzer | |
| 8,775,348 B2 | 7/2014 | Lebeau | |
| 8,798,817 B2 | 8/2014 | O'Dell et al. | |
| 9,558,601 B2 | 1/2017 | Lu et al. | |
| 9,902,506 B2 | 2/2018 | Malta et al. | |

(Continued)

FOREIGN PATENT DOCUMENTS

| | | | | |
|---|---|---|---|---|
| CN | 111017265 A | * | 4/2020 | ............... B64G 1/24 |
| WO | WO-2008089732 A2 | * | 7/2008 | ............... E01H 1/00 |
| WO | WO-2009013318 A2 | * | 1/2009 | ............... G01M 9/06 |

(Continued)

OTHER PUBLICATIONS

Extended European Search Report for EP Application No. 21192483.2 dated Dec. 22, 2021 (12 pages).

(Continued)

*Primary Examiner* — Joseph J Dallo

(74) *Attorney, Agent, or Firm* — Dinsmore & Shohl LLP

(57) ABSTRACT

A method of performing fault isolation for an aircraft comprises identifying a fault that occurs during a flight of the aircraft; identifying a first set of parameters associated with the aircraft based on the identification of the fault; automatically determining values of the first set of parameters to obtain a first set of measured values; determining whether the first set of measured values are within acceptable ranges; and identifying a source of the fault based on the determination of whether the first set of measured values are within the acceptable ranges.

10 Claims, 5 Drawing Sheets

(56) References Cited

U.S. PATENT DOCUMENTS

2010/0283832 A1* 11/2010 Lin ................... G06K 9/6293
348/46
2018/0257663 A1 9/2018 Jiang et al.

FOREIGN PATENT DOCUMENTS

| WO | WO-2009071602 A2 * | 6/2009 | ............... G01L 5/00 |
| WO | WO-2010070070 A1 * | 6/2010 | ......... G05B 19/4184 |
| WO | 2015198216 A1 | 12/2015 | |

OTHER PUBLICATIONS

Extended European Search Report for EP Application No. 21192483.2 dated Apr. 8, 2022 (12 pages).

* cited by examiner

SYSTEM AND METHOD FOR PERFORMING ENHANCED MAINTENANCE OF AIRCRAFT

FIELD

The present disclosure relates to fault isolation, and more specifically to a system and method for performing enhanced maintenance of aircraft.

BACKGROUND

An aircraft may experience problems or faults with one or more aircraft systems during a flight. An aircraft system may detect and record each of the faults that occurred during the flight. Then, upon landing, a maintenance crew may review the recorded faults and perform diagnostics procedures to identify the source of the faults and take any necessary corrective action.

Typically, a maintenance crew follows specific procedures related to specific detected faults. These procedures may involve performing one or more measurements related to the aircraft (e.g., voltages, temperatures). Different procedures may be followed and different measurements may be taken depending on the type of fault detected. The maintenance crew may then diagnose the fault based on the measurements and the procedures. Once the problem is diagnosed, one or more part may be replaced, or other corrective action may be taken.

However, this method of performing fault isolation and aircraft maintenance may be highly labor intensive. Furthermore, the information recorded about detected faults may be limited (e.g., information may include only a time and type of fault detected). Further, the measurements taken when the aircraft is on the ground may be different than when the fault occurred while the aircraft was in flight. This may limit the effectiveness of the fault isolation performed by the maintenance crew. Thus, there is a need for an improved method of performing fault isolation in an aircraft system and performing enhanced maintenance of aircraft.

SUMMARY

In an embodiment, a method of performing fault isolation for an aircraft may include identifying a fault that occurred during a flight of the aircraft, identifying a first set of parameters associated with the aircraft based on the identification of the fault, automatically determining values of the first set of parameters to obtain a first set of measured values, determining whether the first set of measured values are within acceptable ranges, and identifying a source of the fault based on the determination of whether the first set of measured values are within the acceptable ranges.

In an embodiment, a method of performing maintenance on an aircraft may include identifying a fault that occurred during a flight of the aircraft, identifying a first set of parameters associated with the aircraft based on the identification of the fault, automatically determining values of the first set of parameters to obtain a first set of measured values, determining whether the first set of measured values are within acceptable ranges, and determining one or more maintenance procedures to be performed based on the first set of measured values and the determination of whether the first set of measured values are within the acceptable ranges.

In an embodiment, an electronic control unit for an aircraft may included one or more processors, one or more memory modules, and machine readable instructions stored in the one or more memory modules. When executed by the one or more processors, the machine readable instructions may cause the electronic control unit to identify a fault that occurred during a flight of the aircraft, identify a first set of parameters associated with the aircraft based on the identification of the fault, automatically determine values of the first set of parameters to obtain a first set of measured values, determine whether the first set of measured values are within acceptable ranges, and determine one or more maintenance procedures to be performed based on the first set of measured values and the determination of whether the first set of measured values are within the acceptable ranges.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

The present disclosure generally relates to devices, systems, and methods for performing enhanced maintenance operations through situational knowledge. A system described herein may record fault information for an aircraft during a flight, including relevant data associated with faults at the time the fault occurs.

When the aircraft lands, a maintenance crew may attend to the aircraft to make any necessary repairs. The maintenance crew may access the information related to the faults that occurred during the flight. For each detected fault, the maintenance crew may have a checklist of procedures to perform to isolate and correct the fault. The checklist may come from a maintenance manual associated with the aircraft.

The checklist of procedures may involve gathering data associated with the aircraft and determining whether the data is within a normal or acceptable range. The system disclosed herein may provide this data to the maintenance crew, either by outputting current data of the aircraft, or by outputting the data recorded at the time the flight occurred. Based on this data, the maintenance crew may perform the procedures of the checklist. The maintenance crew may then identify and correct the fault.

Figure 1:
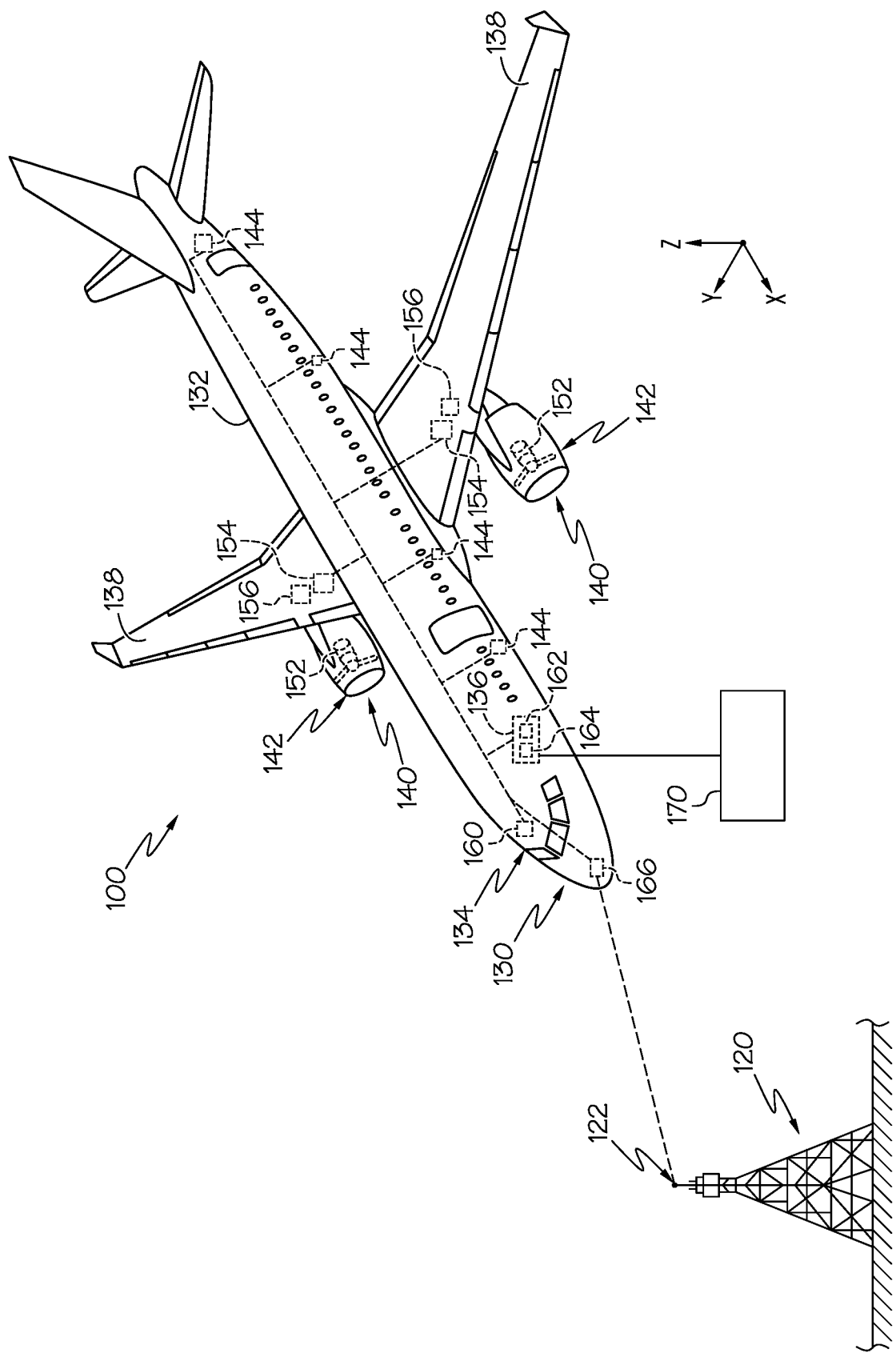
FIG. 1 schematically depicts an illustrative aircraft system according to one or more embodiments shown and described herein.

Referring to FIG. 1, an illustrative aircraft system 100 is schematically depicted. In the illustrated embodiment of FIG. 1, the aircraft system 100 generally includes an aircraft 130, which may include a fuselage 132, wing assemblies 138, and one or more engines 140. While FIG. 1 depicts the aircraft 130 as being a fixed-wing craft having two wing assemblies 138 with one engine 140 mounted on each wing assembly 138 (two engines 140 total), other configurations are contemplated. For example, other configurations and/or aerial vehicles may include high speed compound rotary-wing aircraft with supplemental translational thrust systems, dual contra-rotating, coaxial rotor system aircraft, turbo-props, tilt-rotors, tilt-wing aircraft, conventional take-off and landing aircraft and other turbine driven machines will also benefit from the present disclosure. Furthermore, other configurations may include more than two wing assemblies 138, more than two engines 140 (e.g., trijets, quadjets, etc.), engines 140 that are not mounted to a wing assembly 138 (e.g., mounted to the fuselage 132, mounted to the tail, mounted to the nose, etc.), non-fixed wings (e.g., rotary wing aircraft), and/or the like.

Turning back to the illustrated aircraft system depicted in FIG. 1, as shown, a control mechanism 160 for controlling the aircraft 130 is included in the cockpit 134 and may be operated by a pilot located therein. It should be understood that the term "control mechanism" as used herein is a general term used to encompass all aircraft control components, particularly those typically found in the cockpit 134.

A plurality of additional aircraft systems 144 that enable proper operation of the aircraft 130 may also be included in the aircraft 130 as well as an engine control system 136, and a communication system having the aircraft wireless communications link 166. The additional aircraft systems 144 may generally be any systems that effect control of one or more components of the aircraft 130, such as, for example, cabin pressure controls, elevator controls, rudder controls, flap controls, spoiler controls, landing gear controls, heat exchanger controls, and/or the like. In some embodiments, the avionics of the aircraft 130 may be encompassed by one or more of the additional aircraft systems 144. The aircraft wireless communications link 166 may generally be any air-to-ground communication system now known or later developed. Illustrative examples of the aircraft wireless communications link 166 include, but are not limited to, a transponder, a very high frequency (VHF) communication system, an aircraft communications addressing and reporting system (ACARS), a controller-pilot data link communications (CPDLC) system, a future air navigation system (FANS), and/or the like. The engine control system 136 may be communicatively coupled to the plurality of aircraft systems 144 and the engines 140. In some embodiments, the engine control system 136 may be mounted on one or more of the engines 140 or mounted within the aircraft 130 and communicatively coupled to the engines 140. While the embodiment depicted in FIG. 1 specifically refers to the engine control system 136, it should be understood that other controllers may also be included within the aircraft 130 to control various other aircraft systems 144 that do not specifically relate to the engines 140.

The engine control system 136 generally includes one or more components for controlling each of the engines 140, such as, for example, a diagnostic computer, an engine-related digital electronic unit that is mounted on one or more of the engines 140 or the aircraft 130, and/or the like. The engine control system 136 may also be referred to as a digital engine control system. Illustrative other components within the engine control system that may function with the engine control system 136 and may require software to operate include, but are not limited to, an electronic control unit (ECU) (200, FIG. 2) and other controller devices. The software implemented in any one of these components may be software that is distributed as described herein.

The engine control system 136 may also be connected with other controllers of the aircraft 130. In embodiments, the engine control system 136 may include a processor 162 and/or a non-transitory memory component 164, including non-transitory memory. In some embodiments, the non-transitory memory component 164 may include random access memory (RAM), read-only memory (ROM), flash memory, or one or more different types of portable electronic memory, such as discs, DVDs, CD-ROMs, or the like, or any suitable combination of these types of memory. The processor 162 may carry out one or more programming instructions stored on the non-transitory memory component 164, thereby causing operation of the engine control system 136. That is, the processor 162 and the non-transitory memory component 164 within the engine control system 136 may be operable to carry out the various processes described herein with respect to the engine control system 136, including operating various components of the aircraft 130 (such as the engine 140 and/or components thereof), monitoring the health of various components of the aircraft 130 (e.g., the engine 140 and/or components thereof), monitoring operation of the aircraft 130 and/or components thereof, installing software, installing software updates, modifying a record in a distributed ledger to indicate that software has been installed, and/or updated, carrying out processes according to installed and/or updated software, and/or the like.

In some embodiments, the engine control system 136 may include a full authority digital engine control (FADEC) system. Such a FADEC system can include various electronic components, one or more sensors, and/or one or more actuators that control each of the engines 140. In particular embodiments, the FADEC system includes an ECU, as well as one or more additional components that are configured to control various aspects of performance of the engines 140. The FADEC system generally has full authority over operating parameters of the engines 140 and cannot be manually overridden. A FADEC system generally functions by receiving a plurality of input variables of a current flight condition, including, but not limited to, air density, throttle lever position, engine temperature, engine pressure, and/or the like. The inputs are received, analyzed, and used to determine operating parameters such as, but not limited to, fuel flow, stator vane position, bleed valve position, and/or the like. The FADEC system may also control a start or a restart of the engines 140. The operating parameters of the FADEC can be modified by installing and/or updating software, such as the software that is distributed by the aircraft system 100 described herein. As such, the FADEC can be programmatically controlled to determine engine limitations, receive engine health reports, receive engine maintenance reports and/or the like to undertake certain measures and/or actions in certain conditions.

The software run by the engine control system 136 (e.g., executed by the processor 162 and stored within the non-transitory memory component 164) may include a computer program product that includes machine-readable media for carrying or having machine-executable instructions or data structures. Such machine-readable media may be any available media, which can be accessed by a general purpose or special purpose computer or other machine with a processor. Generally, such a computer program may include routines, programs, objects, components, data structures, algorithms, and/or the like that have the technical effect of performing particular tasks or implementing particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, or special purpose processing machine to perform a certain function or group of functions. In some embodiments, the computer program product may be provided by a component external to the engine control system 136 and installed for use by the engine control system 136. For example, the computer program product may be provided by the ground support equipment 170, as described in greater detail herein. The computer program product may generally be updatable via a software update that is received from one or more components of the aircraft system 100, such as, for example, the ground support equipment 170, as described in greater detail herein. The software is generally updated by the engine control system 136 by installing the update such that the update supplements and/or overwrites one or more portions of the existing program code for the computer program product. The software update may allow the computer program product to more accurately diagnose and/or predict faults, provide additional functionality not originally offered, and/or the like.

In embodiments, each of the engines 140 may include a fan 142 and one or more sensors for sensing various characteristics of the fan 142 during operation of the engines 140. Illustrative examples of the one or more sensors include, but are not limited to, a fan speed sensor 152, a temperature sensor 154, and a pressure sensor 156. The fan speed sensor 152 is generally a sensor that measures a rotational speed of the fan 142 within the engine 140. The temperature sensor 154 may be a sensor that measures a fluid temperature within the engine 140 (e.g., an engine air temperature), a temperature of fluid (e.g., air) at an engine intake location, a temperature of fluid (e.g., air) within a compressor, a temperature of fluid (e.g., air) within a turbine, a temperature of fluid (e.g., air) within a combustion chamber, a temperature of fluid (e.g., air) at an engine exhaust location, a temperature of cooling fluids and/or heating fluids used in heat exchangers in or around an engine, and/or the like. The pressure sensor 156 may be a sensor that measures a fluid pressure (e.g., air pressure) in various locations in and/or around the engine 140, such as, for example, a fluid pressure (e.g., air pressure) at an engine intake, a fluid pressure (e.g., air pressure) within a compressor, a fluid pressure (e.g., air pressure) within a turbine, a fluid pressure (e.g., air pressure) within a combustion chamber, a fluid pressure (e.g., air pressure) at an engine exhaust location, and/or the like.

In some embodiments, each of the engines 140 may have a plurality of sensors associated therewith (including one or more fan speed sensors 152, one or more temperature sensors 154, and/or one or more pressure sensors 156). That is, more than one of the same type of sensor may be used to sense characteristics of an engine 140 (e.g., a sensor for each of the different areas of the same engine 140). In some embodiments, one or more of the sensors may be utilized to sense characteristics of more than one of the engines 140 (e.g., a single sensor may be used to sense characteristics of two engines 140). The engines 140 may further include additional components not specifically described herein, and may include one or more additional sensors incorporated with or configured to sense such additional components in some embodiments.

In embodiments, each of the sensors (including, but not limited to, the fan speed sensors 152, the temperature sensors 154, and the pressure sensors 156) may be communicatively coupled to one or more components of the aircraft 130 such that signals and/or data pertaining to one or more sensed characteristics are transmitted from the sensors for the purposes of determining, detecting, and/or predicting a fault, as well as completing one or more other actions in accordance with software that requires sensor information. As indicated by the dashed lines extending between the various sensors (e.g., the fan speed sensors 152, the temperature sensors 154, and the pressure sensors 156) and the aircraft systems 144 and the engine control system 136 in the embodiment depicted in FIG. 1, the various sensors may be communicatively coupled to the aircraft systems 144 and/or the engine control system 136 in some embodiments. As such, the various sensors may be communicatively coupled via wires or wirelessly to the aircraft systems 144 and/or the engine control system 136 to transmit signals and/or data to the aircraft systems 144 and/or the engine control system 136 via an aircraft bus.

An aircraft bus may enable an aircraft and/or one or more components of the aircraft to interface with one or more external system through wireless or wired means. An aircraft bus as used herein may be formed from any medium that is configured to transmit a signal. As non-limiting examples, the aircraft bus is formed of conductive wires, conductive traces, optical waveguides, or the like. The aircraft bus may also refer to the expanse in which electromagnetic radiation and their corresponding electromagnetic waves are propagated. Moreover, the aircraft bus may be formed from a combination of mediums configured to transmit signals. In one embodiment, the aircraft bus includes a combination of conductive traces, conductive wires, connectors, and buses that cooperate to permit the transmission of electrical data signals to and from the various components of the engine control system 136. Additionally, it is noted that the term "signal" means a waveform (e.g., electrical, optical, magnetic, mechanical or electromagnetic) configured to travel through a medium, such as DC, AC, sinusoidal-wave, triangular-wave, square-wave, vibration, and the like.

For example, an interconnectivity of components coupled via a network, may include a wide area network, such as the internet, a local area network (LAN), a mobile communications network, a public service telephone network (PSTN) and/or other network and may be configured to electronically connect components. The illustrative components that may be connected via the network include, but are not limited to, a ground system 120 in communication with the aircraft 130 (e.g., via a ground wireless communications link 122 and an aircraft wireless communications link 166), and/or a ground support equipment 170 via a wired or wireless system.

It should be understood that the aircraft 130 merely represents one illustrative embodiment that may be configured to implement embodiments or portions of embodiments of the devices, systems, and methods described herein. During operation, by way of non-limiting example, the control mechanism 160 may be utilized to operate one or more of the aircraft systems 144. Various sensors, including, but not limited to, the fan speed sensors 152, the temperature sensors 154, and/or the pressure sensors 156 may output data relevant to various characteristics of the engine 140 and/or the other aircraft systems 144. The engine control system 136 may utilize inputs from the control mechanism 160, the fan speed sensors 152, the temperature sensors 154, the pressure sensors 156, the various aircraft systems 144, one or more database, and/or information from airline control, flight operations, or the like to diagnose, detect, and/or predict faults that airline maintenance crew may be unaware of. Among other things, the engine control system 136 may analyze the data output by the various sensors (e.g., the fan speed sensors 152, the temperature sensors 154, the pressure sensors 156, etc.), over a period of time to determine drifts, trends, steps, or spikes in the operation of the engines 140 and/or the various other aircraft systems 144. The engine control system 136 may also analyze the system data to determine historic pressures, historic temperatures, pressure differences between the plurality of engines 140 on the aircraft 130, temperature differences between the plurality of engines 140 on the aircraft 130, and/or the like, and to diagnose, detect, and/or predict faults in the engines 140 and/or the various other aircraft systems 144 based thereon. The aircraft wireless communications link 166 and the ground wireless communications link 122 may transmit data such that data and/or information pertaining to the fault may be transmitted off the aircraft 130.

While the embodiment of FIG. 1 specifically relates to components within an aircraft 130, the present disclosure is not limited to such. That is, the various components depicted with respect to the aircraft 130 may be incorporated within various other types of craft and may function in a similar manner to deliver and install new software and/or updated software to the engine control system 136 as described herein. For example, the various components described herein with respect to the aircraft 130 may be present in watercraft, spacecraft, and/or the like without departing from the scope of the present disclosure.

Furthermore, it should be appreciated that, although a particular aerial vehicle has been illustrated and described, other configurations and/or aerial vehicles, such as high speed compound rotary-wing aircraft with supplemental translational thrust systems, dual contra-rotating, coaxial rotor system aircraft, turboprops, tilt-rotors, tilt-wing aircraft, conventional take-off and landing aircraft and other turbine driven machines will also benefit from the present disclosure.

Still referring to FIG. 1, the ground system 120 is generally a transmission system located on the ground that is capable of transmitting and/or receiving signals to/from the aircraft 130. That is, the ground system 120 may include a ground wireless communications link 122 that is communicatively coupled to the aircraft wireless communications link 166 wirelessly to transmit and/or receive signals and/or data. In some embodiments, the ground system 120 may be an air traffic control (ATC) tower and/or one or more components or systems thereof. Accordingly, the ground wireless communications link 122 may be a VHF communication system, an ACARS unit, a CPDLC system, FANS, and/or the like. Using the ground system 120 and the ground wireless communications link 122, the various non-aircraft components depicted in the embodiment of FIG. 1 may be communicatively coupled to the aircraft 130, even in instances where the aircraft 130 is airborne and in flight, thereby allowing for on-demand transmission of software and/or software updates whenever such software and/or software updates may be needed. However, it should be understood that the embodiment depicted in FIG. 1 is merely illustrative. In other embodiments, the aircraft 130 may be communicatively coupled to the various other components of the aircraft system 100 when on the ground and physically coupled to one of the components of the aircraft system 100, such as, for example, the ground support equipment 170.

The ground support equipment (GSE) 170 is an external equipment used to support and test the engine control system 136 and/or other components of the aircraft 102. The ground support equipment 170 is configured to provide software updates to the engine control system 136 and download data obtained by the engine control system 136 during a flight. As another non-limiting example, the GSE 170 may include production support equipment for restricted data monitoring, test support equipment for comprehensive data monitoring and changing adjustable parameters, and integration test rigs for system and software testing. In embodiments, the GSE 170 may be connected to the engine control system 136 via wired local area network, or Ethernet. The GSE 170 may communicate with the engine control system 136 according to Ethernet protocols. The GSE 170 may be a portable maintenance access terminal. The GSE 170 may test a ballistic mode of the aircraft by directly communicating with the ECU 200 of the engine control system 136, which is described in more detail herein.

Figure 2:
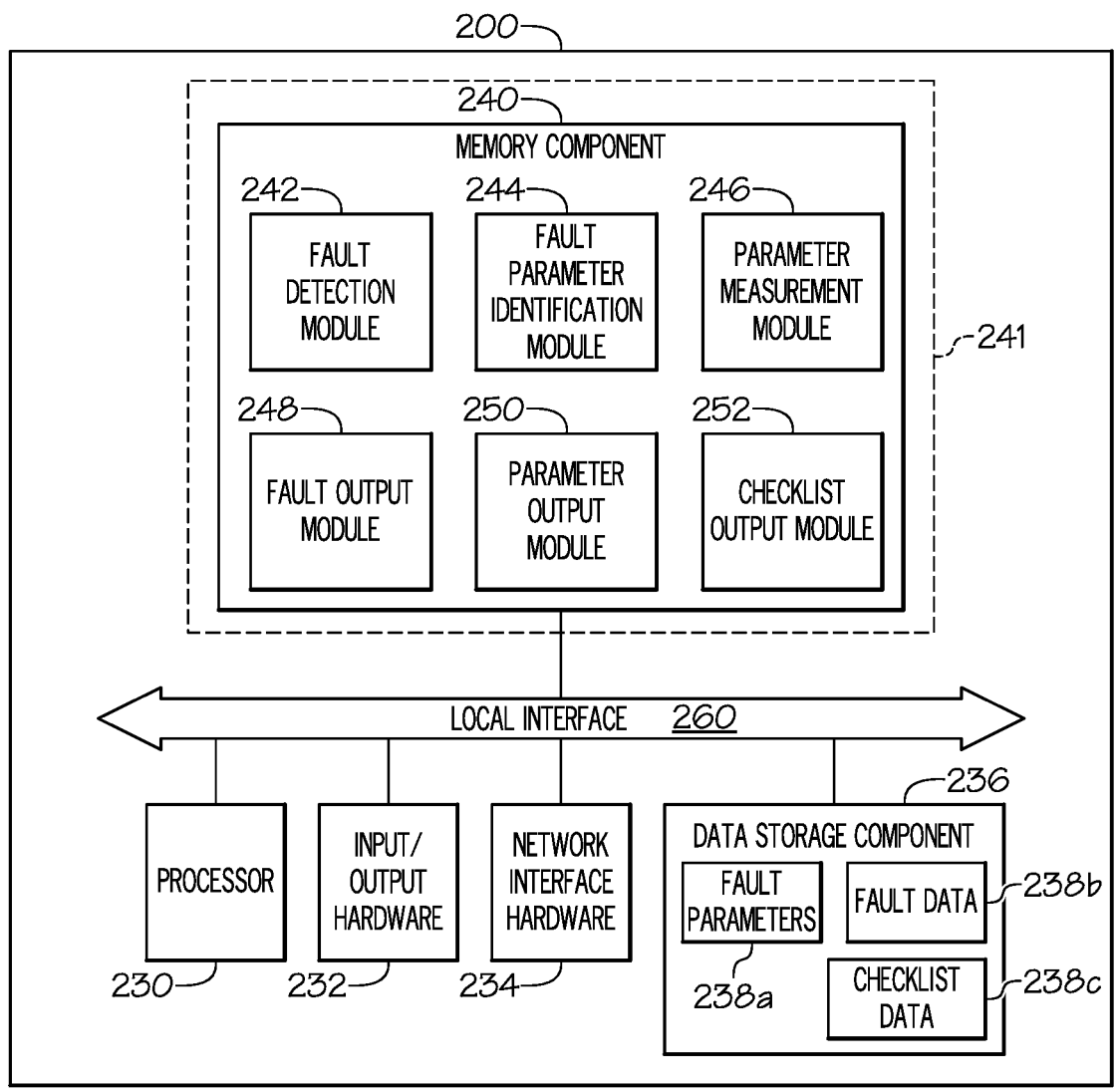
FIG. 2 schematically depicts a functional block diagram of an engine control system configured with a fault isolation system according to one or more embodiments shown and described herein.

FIG. 2 will now describe illustrative embodiments of a fault isolation system 241. Turning to FIG. 2, an illustrative system diagram of the electronic control unit (ECU) 200 is depicted. The ECU 200 may include a computing device having the ability to operate and interface with components of the aircraft system 100, for example, the components described herein with respect to FIG. 1. The ECU 200 may include a processor 230, input/output hardware 232, network interface hardware 234, a data storage component 236, and a memory component 240. In the illustrated example, the memory component 240 comprises the fault isolation system 241. In other examples, the fault isolation system 241 may reside in other components of the aircraft system 100 such as an aircraft health management unit The processor 230 may include any processing component(s) configured to receive and execute instructions (such as from the data storage component 236 and/or the memory component 240). The instructions may be in the form of a machine-readable instruction set stored in the data storage component 236 and/or the memory component 240. The input/output hardware 232 may include a display, keyboard, mouse, printer, camera, microphone, speaker, and/or other device for receiving, sending, and/or presenting data. The network interface hardware 234 may include any wired or wireless networking hardware, such as a modem, LAN port, Wi-Fi card, WiMax card, mobile communications hardware, and/or other hardware for communicating with other networks and/or devices. For example, the network interface hardware 234 may include a transceiver.

The memory component 240 may be machine-readable memory (which may also be referred to as a non-transitory processor readable memory). The memory component 240 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store a fault detection module 242, a fault parameter identification module 244, a parameter measurement module 246, a fault output module 248, a parameter output module 250, a checklist output module 252, and/or other modules that may be necessary for enabling operation of the fault isolation system 241 (each of which may be embodied as a computer program, firmware, or hardware, as an example).

A local interface 260 is also included in FIG. 2 and may be implemented as a bus or other interface to facilitate communication among the components of the ECU 200.

The data storage component 236 may reside local to and/or remote from the ECU 200 and may be configured to store one or more pieces of data for access by the ECU 200 and/or other components. As illustrated in FIG. 2, the data storage component 236 may store fault parameters 238a, fault data 238b, checklist data 238c, and/or other data sets, as disclosed in further detail below.

As explained above, the aircraft system 100 may include a variety of sensors that may detect faults during a flight. In known systems, the faults may be identified and recorded by the ECU 200 or other components of the aircraft system 100 based on the sensor data. Then, when the aircraft 130 lands, a maintenance crew may view the faults that were recorded and perform the procedures outlined in a maintenance manual for each of the identified faults. A maintenance manual may include a set of procedures for a maintenance crew to follow in order to perform fault isolation and identify a source of a fault on the aircraft. Different types of faults may require different procedures to be performed. These procedures often involve measuring values of various parameters of the aircraft 130 (e.g., voltages, currents, temperatures, etc.). Based on these measured values, the maintenance manual may identify what the source of a fault is and may identify a particular part that should be changed and/or what other corrective action should be taken. For example, if a particular voltage is too high, the maintenance manual may recommend replacing a particular part.

However, after the aircraft 130 lands, the conditions are not the same as when the aircraft 130 was in flight. For example, the temperature on the ground may be significantly higher than the temperature when the aircraft 130 is in flight at 20,000 feet. In addition, other systems of the aircraft 130 may no longer be in use or may be in a different state than when the aircraft 130 was in flight. As such, it may be difficult to diagnose the source of faults detected during a flight when the conditions that occurred when the fault was detected cannot be recreated on the ground.

As such, the aircraft system 100 of the present disclosure measures important values of parameters associated with the aircraft 130 when a fault is detected, as disclosed herein. Then, when the aircraft 130 lands, a maintenance crew may review the measured values recorded when a fault occurred in order to perform the procedures of a maintenance manual. Thus, a more accurate fault isolation method may be performed based on conditions of the aircraft 130 when a fault occurred during flight rather than conditions of the aircraft 130 on the ground.

Referring still to FIG. 2, the fault parameters 238a may comprise a list of aircraft parameters associated with a variety of faults. The fault parameters 238a may be taken from a maintenance manual associated with the aircraft 130. For example, for a particular fault, associated aircraft parameters may include a voltage of one component, and a temperature of another component. Any number of parameters may be associated with each fault. In embodiments, the parameters associated with a particular fault include the parameters that a maintenance manual indicates should be measured when the particular fault occurs. By storing the fault parameters 238a in the data storage component 236, the fault isolation system 241 is able to measure appropriate values when a particular fault occurs for later use by a maintenance crew, as explained in further detail below.

The fault data 238b comprises measured values of parameters of the aircraft 130 when a fault is detected. The fault data 238b is stored in the data storage component 236 such that a maintenance crew can review the data after the aircraft 130 lands. The fault data 238b is discussed in further detail below.

The checklist data 238c comprises data associated with a checklist to be performed when a fault is detected. As explained above, when a fault is detected, a maintenance manual includes a set of procedures to be performed to identify the source of the fault. This set of procedures may be in the form of a checklist. In some embodiments, the fault isolation system 241 may implement a smart checklist procedure based on the checklist data 238c. The smart checklist procedure is discussed in further detail below.

Referring still to FIG. 2, the memory component 240 may include a fault detection module 242, a fault parameter identification module 244, a parameter measurement module 246, a fault output module 248, a parameter output module 250, and a checklist output module 252. As explained above, the ECU 200 may utilize data from one or more sensors of the aircraft system 100 to identify faults that occur during a flight. In embodiments, this fault detection may be performed by the fault detection module 242 using known techniques. The fault detection module 242 may store information regarding detected faults as fault data 238b in the data storage component 236.

The fault parameter identification module 244 may identify one or more parameters associated with a fault detected by the fault detection module 242. Specifically, the fault parameter identification module 244 may access the fault parameters 238a stored in the data storage component 236 to identify the parameters associated with the fault detected by the fault detection module 242. As discussed above, the parameters associated with a particular fault comprise values associated with one or more components of the aircraft 130 to be measured to assist in a later diagnosis of the fault. For example, the parameters may comprise voltages, currents, pressures, temperatures, positions, or other values associated with components of the aircraft 130.

The parameter measurement module 246 measures values of the parameters identified by the fault parameter identification module 244. The parameter measurement module 246 may utilize one or more sensors of the aircraft system 100 to perform the measurement of the parameters. The parameter measurement module 246 may measure values of the parameters at the same time or shortly after the fault detection module 242 detects a fault. Thus, the measured values may comprise values for the parameters when a fault occurs. As such, when a maintenance crew performs maintenance on the aircraft 130 after it lands, the maintenance crew may diagnose a fault based on data at the time a fault occurred, rather than based on data measured while the aircraft 130 is on the ground in different conditions than when the fault occurred. The parameter measurement module 246 may store the measured values of parameters as fault data 238b in the data storage component 236.

After the aircraft 130 completes a flight and lands, and a maintenance crew performs maintenance on the aircraft 130, the fault output module 248 may access the fault data 238b in the data storage component 236 and output an indication of each fault that occurred during the flight. In one example, the fault information may be output to the GSE 170. In another example, the fault information may be output to the input/output hardware 232. In still other examples, the fault information may be output to other devices using the network interface hardware 234. The fault output module 248 outputs an indication of each fault that occurred during the flight such that a maintenance crew can view the information and perform appropriate maintenance.

The parameter output module 250 may access the fault data 238b in the data storage component 236 and output the values of the parameters associated with faults that were measured when those faults occurred. Similar to the fault output module 248, the parameter output module 250 may output the measured parameter values to the GSE 170, or the input/output hardware 232, or the network interface hardware 234, or otherwise such that they may be viewed by a maintenance crew. The parameters output by the parameter output module 250 and the faults output by the fault output module 248 may allow a maintenance crew to perform maintenance on the aircraft 130 to identify the source of the faults. In some examples, the maintenance crew may use a checklist in a maintenance manual to perform maintenance. In other examples, the maintenance crew may utilize a smart checklist procedure, as discussed below.

Referring still to FIG. 2, the checklist output module 252 may access the checklist data 238c from the data storage component 236 and output checklist information such that it may be viewed by a maintenance crew. The checklist output module 252 may output checklist information associated with the faults output by the fault output module 248. Thus, the maintenance crew may perform the procedures included in the checklist information output by the checklist output module 252. This may include procedures to be performed by the maintenance crew to determine the source of the identified faults. As explained above, these procedures may be based on a maintenance module for the aircraft 130.

In another example, the checklist output module 252 may implement a smart checklist procedure. In this example, the checklist output module 252 may access the checklist data 238c and may identify one or more checklists associated with the faults output by the fault output module 248. These checklists may include procedures to be performed by a maintenance crew. These procedures may involve checking the values of one or more parameters and determining whether the values are within acceptable ranges. The acceptable ranges may be defined by the checklists. Thus, for each checklist output by the checklist output module 252, the checklist output module 252 may automatically perform certain steps of the checklist. Specifically, for steps of the checklist that comprise checking whether parameter values are within acceptable ranges, the checklist output module 252 may access the fault data 238b in the data storage component 236 and determine whether parameter values identified in the checklist are within acceptable ranges. Then, the checklist output module 252 may output an indication of the parameter values that are within acceptable ranges and a corresponding indication that those values do not need to be checked by the maintenance crew. As such, the number of steps of the checklist that need to be performed by the maintenance crew is reduced, thereby increasing the efficiency of the maintenance crew.

Figure 3:
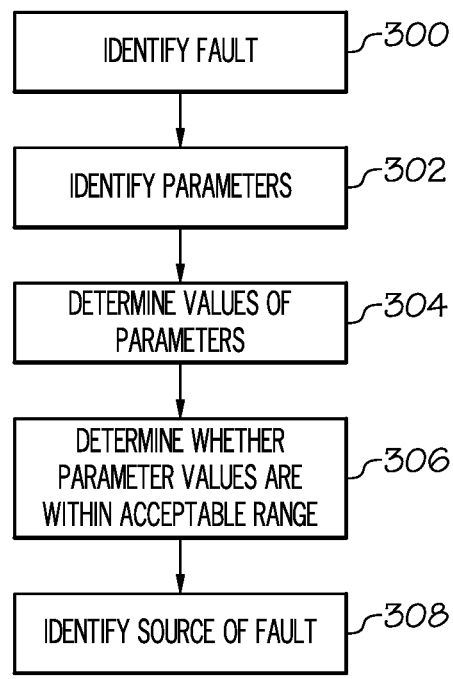
FIG. 3 depicts a flow diagram of an illustrative method of performing fault isolation for an aircraft.

Turning to FIG. 3, an illustrative flow diagram depicting a method of performing fault isolation for an aircraft is shown. The method of FIG. 3 may be performed by the ECU 200.

At step 300, the fault detection module 242 identifies a fault that occurred during a flight of the aircraft 130. The fault detection module 242 may identify the fault based on data captured by one or more sensors of the aircraft system 100. The fault detection module 242 may record the detected fault as fault data 238b in the data storage component 236. In addition, the fault output module 248 may outputs an indication of the fault. The fault output module 248 may output the indication of the fault to a maintenance crew when the aircraft 130 is on the ground after it has landed. The fault output module 248 may use the fault data 238b stored in the data storage component 236 to output the indication of the fault. The indication of the fault output by the fault output module 248 may include a time that the fault occurred, a type of fault that occurred, and other information related to the fault At step 302, the fault parameter identification module 244 identifies a first set of parameters associated with the aircraft 130 based on the identification of the fault. The fault parameter identification module 244 may identify the set of parameters based on the fault parameters 238a stored in the data storage component 236.

At step 304, the fault isolation system 241 automatically determines values of the first set of parameters to obtain a first set of measured values. In a traditional mode of operation, the parameter measurement module 246 measures current values of the first set of parameters. As such, in the traditional mode of operation, the first set of measured values comprise values of parameters (e.g., voltages, temperatures) measured while the aircraft 130 is being serviced by a maintenance crew. This is similar to traditional maintenance where the maintenance crew would obtain measurements of parameters while the aircraft is on the ground. However, in the traditional mode of operation of the fault isolation system 241, the values of the parameters are measured and output to the maintenance crew automatically. Thus, the maintenance crew does not need to manually obtain the measurements. As such, in the traditional mode of operation, the second set of measured values of the set of parameters comprises current values of the parameters. Specifically, the parameter measurement module 246 may record current values of the parameters associated with the fault and the parameter output module 250 may output the measured value of the parameters to the maintenance crew.

Alternatively, in a historic mode of operation, the parameter output module 250 outputs historic values of the parameters such that the first set of measured values comprise values of the first set of parameters measured at a time that the fault occurred. Specifically, the parameter output module 250 outputs values of the parameters recorded at the time the fault occurred. As such, the maintenance crew may be able to obtain a more accurate picture of the conditions that existed at the time the fault occurred. This may allow the maintenance crew to better diagnose and correct the fault. Thus, in the historic mode of operation, the second set of the measured values of the set of parameters comprise the recorded first set of measured values. In either the traditional or historic mode of operation, the first set of measured values may be recorded as fault data 238b in the data storage component 236.

At step 306, the checklist output module 252 determines whether the first set of measured values are within acceptable ranges. The acceptable ranges for the first set of measured values may be based on a maintenance manual associated with the aircraft. Then, at step 306, the checklist output module identifies a source of the fault based on the determination of whether the first set of measured values are within the acceptable ranges. The source of the fault may comprise a component of the aircraft.

Figure 4:
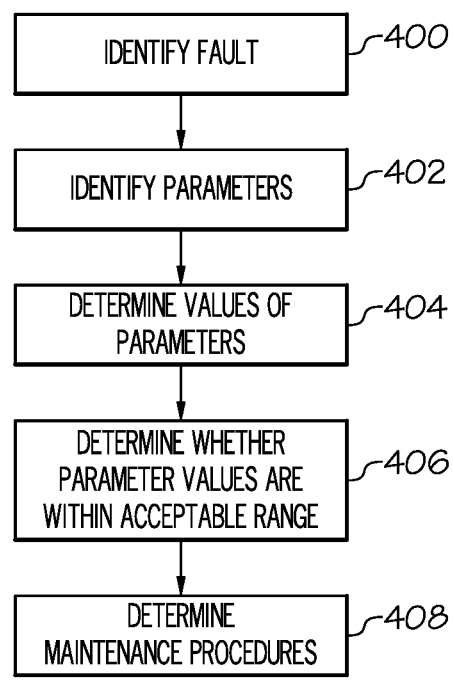
FIG. 4 depicts a flow diagram of another method of performing for isolation for an aircraft.

Turning to FIG. 4, an illustrative flow diagram depicting another method of performing fault isolation for an aircraft is shown. The method of FIG. 4 may be performed by the ECU 200.

At step 400, the fault detection module 242 identifies a fault that occurred during a flight of the aircraft 130. The fault detection module 242 may identify the fault based on data captured by one or more sensors of the aircraft system 100.

At step 402, the fault parameter identification module 244 identifies a first set of parameters associated with the aircraft 130 based on the identification of the fault. The fault parameter identification module 244 may identify the set of parameters based on the fault parameters 238a stored in the data storage component 236.

At step 404, the fault isolation system 241 automatically determines values of the first set of parameters to obtain a first set of measured values. As disclosed above, the fault isolation system 241 may operate in either traditional or historic mode. In the traditional mode of operation, the first measured values comprise current values of the first set of parameters. In the historic mode of operation, the first set of measured values comprise values of the first set of parameters measured at a time that the fault occurred.

At step 406, the checklist output module 252 determines whether the first set of measured values are within acceptable ranges. Then at step 408, the checklist output module 252 determines one or more maintenance procedures to be performed based on the first set of measured values and the determination of whether the first set of measured values are within the acceptable ranges. The one or more maintenance procedures may comprise maintenance procedures from a checklist based on a maintenance manual associated with the aircraft.

The checklist output module 252 may also output the checklist, which may comprise a set of procedures to be performed to identify a source of the fault, wherein the checklist is based on a type of the fault. The checklist may comprise checklist data 238c stored in the data storage component 236. In some examples, the checklist is based on a maintenance manual associated with the aircraft 130. The checklist data 238c may comprise a set of procedures to be performed by a maintenance crew based on the identified fault. One or more of these procedures may comprise determining whether one or more values of parameters are within an acceptable range.

In some examples, the fault isolation system 241 may automatically perform certain steps of a checklist associated with the fault by determining whether one or more parameter values are within an acceptable range. The fault isolation system 241 may then output to the maintenance crew a subset of the one or more maintenance procedures from the checklist that do not need to be performed, wherein the subset is based on the first set of measured values and the determination of whether the first set of measured values are within the acceptable ranges. When the fault isolation system 241 is operating in the traditional mode of operation, it may determine that certain procedures of a checklist do not need to be performed based on current parameter values. Alternatively, when the fault isolation system 241 is operating in the historic mode of operation, it may determine that certain procedures of a checklist do not need to be performed based on historic parameter values (e.g., parameter values measured at the time of the fault).

In the traditional mode of operation, the parameter measurement module 246 may measure current values of the set of parameters. That is, the parameter measurement module 246 may measure parameter values while the aircraft 130 is on the ground. The checklist output module 252 then determine one or more procedures of the set of procedures of the checklist that do not need to be performed based on the measured current values of the set of parameters. Specifically, the checklist output module 252 may determine that the current value of one or more parameters are within an acceptable range and, thus, procedures comprising checking whether these values are within an acceptable range need not be performed. The checklist output module 252 may then output the one or more procedures that do not need to be performed.

In the historic mode of operation, the checklist output module 252 determine one or more procedures of the set of procedures of the checklist that do not need to be performed based on the first set of measured values. That is, the checklist output module 252 may determine procedures that do not need to be performed based on the historic values of parameters measured at the time the fault occurred. Specifically, the checklist output module 252 may determine that historic value of one or more parameters are within an acceptable range and, thus, procedures comprising checking whether these values are within an acceptable range need not be performed. The checklist output module 252 may then output the one or more procedures that do not need to be performed.

Figure 5:
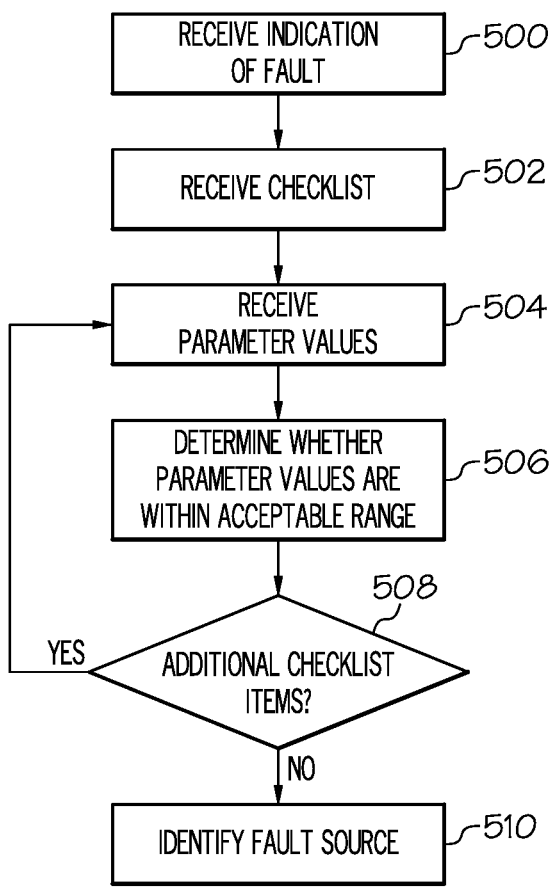
FIG. 5 depicts a flow diagram of an illustrative method of performing aircraft maintenance for an aircraft.

Turning to FIG. 5, an illustrative flow diagram depicting a method of performing aircraft maintenance for an aircraft that may be performed by an aircraft maintenance crew is shown.

At step 500, the maintenance crew receives an indication of a fault that occurred during a flight of the aircraft. When the fault isolation system 241 is operating in the traditional mode of operation, the measured values of the set of parameters comprise current values of the parameters. That is, values of the parameters at the time that maintenance is being performed. When the fault isolation system 241 is operating in the historic mode of operation, the measured values of the set of parameters comprise historic values of the first set of parameters recorded at a time when the fault occurred.

At step 502, the maintenance crew receives a checklist comprising a set of procedures to be performed to identify a source of the fault, wherein the checklist is based on a type of fault that occurred. The checklist may be based on a maintenance manual associated with the aircraft 130. In some examples, the maintenance crew receives a subset of the procedures of the checklist that do not need to be performed, wherein the subset is based on the measured values of the one or more parameters of the set of parameters. In the traditional mode of operation, the subset is based on current values of the one or more parameters of the set of parameters. In the historic mode of operation, the subset is based on historic values of the first set of parameters recorded at a time when the fault occurred.

At step 504, the maintenance crew receives measured values of a set of parameters associated with the aircraft, wherein the set of parameters is based on the checklist. In some examples, the maintenance crew may receive parameters associated with one procedure on the checklist.

At step 506, the maintenance crew determines whether the measured values of the set of parameters are within acceptable ranges. The acceptable ranges for the measured values of the set of parameters may be identified in the checklist and/or in a maintenance manual associated with the aircraft 130.

At step 508, the maintenance crew determines whether additional procedures remain on the checklist. If the maintenance crew determines that additional procedures remain on the checklist (yes at step 508), then control returns to step 504 and additional parameter values are received associated with another procedure on the checklist. If the maintenance crew determines that no additional procedures remain on the checklist (no at step 508), then control passes to step 510.

At step 510, the maintenance crew identifies a source of the fault based on the determination of whether the measured values of the set of parameters are within acceptable ranges. In some examples, the source of the fault comprises a component of the aircraft. In these examples, the maintenance crew may replace the faulty component.

The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

It should now be understood that that the devices, systems, and methods described herein allow for enhanced maintenance of aircraft. During an aircraft flight, an engine control system detects faults in one or more components of the aircraft. When a fault is detected, values of aircraft parameters associated with the fault are measured and stored. Once the aircraft lands, a maintenance crew may access the stored information relating to the detected faults. The maintenance crew may then perform maintenance of the aircraft by following procedures outlined in a maintenance manual including determining whether the stored parameter values are outside of a normal range. In some examples, the engine control system may automatically determine whether certain parameter values are outside of a normal range. After following the procedures for detected faults, the maintenance crew may identify the source of the faults and take necessary corrective action.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses.

A method of performing fault isolation for an aircraft comprising: identifying a fault that occurred during a flight of the aircraft; identifying a first set of parameters associated with the aircraft based on the identification of the fault; automatically determining values of the first set of parameters to obtain a first set of measured values; determining whether the first set of measured values are within acceptable ranges; and identifying a source of the fault based on the determination of whether the first set of measured values are within the acceptable ranges.

A method of any preceding clause, wherein the first set of measured values comprise current values of the first set of parameters.

A method of any preceding clause, wherein the first set of measured values comprise values of the first set of parameters measured at a time that the fault occurred.

A method of any preceding clause, wherein the acceptable ranges for the first set of measured values are based on a maintenance manual associated with the aircraft.

A method of any preceding clause, wherein the source of the fault comprises a component of the aircraft.

A method of any preceding clause, further comprising: determining one or more maintenance procedures to be performed to confirm the source of the fault based on the determination of whether the first set of measured values are within the acceptable ranges.

A method of performing maintenance on an aircraft comprising: identifying a fault that occurred during a flight of the aircraft; identifying a first set of parameters associated with the aircraft based on the identification of the fault; automatically determining values of the first set of parameters to obtain a first set of measured values; determining whether the first set of measured values are within acceptable ranges; and determining one or more maintenance procedures to be performed based on the first set of measured values and the determination of whether the first set of measured values are within the acceptable ranges.

A method of any preceding clause, wherein the first set of measured values comprise current values of the first set of parameters.

A method of any preceding clause, wherein the first set of measured values comprise values of the first set of parameters measured at a time that the fault occurred.

A method of any preceding clause, wherein the one or more maintenance procedures comprise maintenance procedures from a checklist based on a maintenance manual associated with the aircraft.

A method of any preceding clause, further comprising: receiving a subset of the one or more maintenance procedures from the checklist that do not need to be performed, wherein the subset is based on the first set of measured values and the determination of whether the first set of measured values are within the acceptable ranges.

A method of any preceding clause, wherein the subset of the one or more maintenance procedures is based on current values of the first set of measured values.

A method of any preceding clause, wherein the subset is based on values of the first set of parameters measured at a time that the fault occurred.

An electronic control unit for an aircraft comprising: one or more processors; one or more memory modules; and machine readable instructions stored in the one or more memory modules that, when executed by the one or more processors, cause the electronic control unit to: identify a fault that occurred during a flight of the aircraft; identify a first set of parameters associated with the aircraft based on the identification of the fault; automatically determine values of the first set of parameters to obtain a first set of measured values; determine whether the first set of measured values are within acceptable ranges; and determine one or more maintenance procedures to be performed based on the first set of measured values and the determination of whether the first set of measured values are within the acceptable ranges.

An electronic control unit of any preceding clause, wherein the first set of measured values comprise current values of the first set of parameters.

An electronic control unit of any preceding clause, wherein the first set of measured values comprise values of the first set of parameters measured at a time that the fault occurred.

An electronic control unit of any preceding clause, wherein the one or more maintenance procedures comprise maintenance procedures from a checklist based on a maintenance manual associated with the aircraft.

An electronic control unit of any preceding clause, wherein the machine readable instructions, when executed, cause the electronic control unit to: receive a subset of the one or more maintenance procedures from the checklist that do not need to be performed, wherein the subset is based on the first set of measured values and the determination of whether the first set of measured values are within the acceptable ranges.

An electronic control unit of any preceding clause, wherein the subset of the one or more maintenance procedures is based on current values of the first set of measured values.

An electronic control unit of any preceding clause, wherein the subset is based on values of the first set of parameters measured at a time that the fault occurred.

What is claimed is:

1. A method of performing maintenance on an aircraft comprising:
    identifying a fault that occurs during a flight of the aircraft;
    identifying a first set of parameters of the aircraft associated with the fault;
    receiving data from one or more sensors of the aircraft to determine values of the first set of parameters of the aircraft during first conditions when the aircraft is in flight to obtain a first set of measured values; and
    during second conditions after the aircraft lands:
    outputting information about the fault and the first set of measured values;
    determining a first set of maintenance procedures to be performed based on the fault and a checklist based on a maintenance manual associated with the aircraft;
    determining whether the first set of measured values are within acceptable ranges; and
    determining a subset of the first set of maintenance procedures not to be performed based on the first set of measured values and the determination of whether the first set of measured values are within the acceptable ranges.

2. The method of claim 1, wherein the first set of measured values comprise current values of the first set of parameters.

3. The method of claim 1, wherein the first set of measured values comprise values of the first set of parameters measured at a time that the fault occurred.

4. The method of claim 1, wherein the subset of the one or more maintenance procedures is based on current values of the first set of measured values.

5. The method of claim 1, wherein the subset is based on values of the first set of parameters measured at a time that the fault occurred.

6. An electronic control unit for an aircraft comprising:
    one or more processors;
    one or more memory modules; and
    machine readable instructions stored in the one or more memory modules that, when executed by the one or more processors, cause the electronic control unit to:
    identify a fault that occurs during a flight of the aircraft;
    identify a first set of parameters of the aircraft associated with the fault;
    receive data from one or more sensors of the aircraft to determine values of the first set of parameters of the aircraft during first conditions when the aircraft is in flight to obtain a first set of measured values; and
    during second conditions after the aircraft lands:
    output information about the fault and the first set of measured values;
    determine a first set of maintenance procedures to be performed based on the fault and a checklist based on a maintenance manual associated with the aircraft;
    determine whether the first set of measured values are within acceptable ranges; and
    determine a subset of the first set of maintenance procedures not to be performed based on the first set of measured values and the determination of whether the first set of measured values are within the acceptable ranges.

7. The electronic control unit of claim 6, wherein the first set of measured values comprise current values of the first set of parameters.

8. The electronic control unit of claim 6, wherein the first set of measured values comprise values of the first set of parameters measured at a time that the fault occurred.

9. The electronic control unit of claim 6, wherein the subset of the one or more maintenance procedures is based on current values of the first set of measured values.

10. The electronic control unit of claim 6, wherein the subset is based on values of the first set of parameters measured at a time that the fault occurred.

* * * * *